United States Patent
Rykaczewski et al.

(10) Patent No.: US 10,577,711 B2
(45) Date of Patent: Mar. 3, 2020

(54) METAL MATRIX HYDROPHOBIC NANOPARTICLE COMPOSITES AND METHODS OF SYNTHESIS

(71) Applicant: ARIZONA BOARD OF REGENTS ON BEHALF OF ARIZONA STATE UNIVERSITY, Scottsdale, AZ (US)

(72) Inventors: Konrad Rykaczewski, Tempe, AZ (US); Viraj Damle, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 560 days.

(21) Appl. No.: 15/250,648

(22) Filed: Aug. 29, 2016

(65) Prior Publication Data
US 2017/0058141 A1   Mar. 2, 2017

Related U.S. Application Data

(60) Provisional application No. 62/211,543, filed on Aug. 28, 2015.

(51) Int. Cl.
| | | |
|---|---|---|
| C25D 3/12 | (2006.01) | |
| C25D 3/38 | (2006.01) | |
| C25D 3/30 | (2006.01) | |
| C25D 3/48 | (2006.01) | |
| C25D 15/00 | (2006.01) | |

(Continued)

(52) U.S. Cl.
CPC ............. C25D 15/00 (2013.01); C25D 7/006 (2013.01); B82Y 20/00 (2013.01)

(58) Field of Classification Search
CPC . C25D 15/00; C25D 3/12; C25D 3/38; C25D 7/00; C25D 3/30; C25D 3/48
See application file for complete search history.

(56) References Cited

U.S. PATENT DOCUMENTS

| | | | |
|---|---|---|---|
| 8,535,604 B1 * | 9/2013 | Baker | ................... B22F 1/0003 419/10 |
| 2014/0166889 A1 * | 6/2014 | Kang | ........................ C03C 4/12 250/366 |

OTHER PUBLICATIONS

Rykaczewski, Konrad, J. H. J. Scott, and Andrei G. Fedorov. "Electron beam heating effects during environmental scanning electron microscopy imaging of water condensation on superhydrophobic surfaces." Applied Physics Letters 98.9 (2011): 093106.

(Continued)

Primary Examiner — Zulmariam Mendez
(74) Attorney, Agent, or Firm — Fish & Richardson P.C.

(57) ABSTRACT

Embodiments of the invention provide a method of forming a metal matrix composite including introducing a plurality of nanoparticles into a flow of metal material, and mixing of at least a partial portion of the flow of metal material with at least some of the plurality of nanoparticles to form a mixture of the metal material and at least some of the nanoparticles. The method further includes forming a metal matrix composite from the mixture, where the metal matrix composite includes a bulk region and an outer surface including a plurality of hydrophobic regions dispersed within a hydrophilic surface region. Further, the plurality of hydrophobic regions is formed or derived from the plurality of nanoparticles, and the hydrophobic regions have a first diameter, and an average spacing between the hydrophobic regions is a second diameter, where the first and second diameters are about 100 nm to 400 nm.

20 Claims, 7 Drawing Sheets

(51) Int. Cl.
 C25D 7/00 (2006.01)
 B82Y 20/00 (2011.01)

(56) References Cited

OTHER PUBLICATIONS

Rykaczewski, Konrad, et al. "Three dimensional aspects of droplet coalescence during dropwise condensation on superhydrophobic surfaces." Soft Matter 7.19 (2011): 8749-8752.
Rykaczewski, Konrad, et al. "Flow nanorough is rough enough to make a surface superhydrophobic during water condensation?." Soft Matter 833 (2012): 8786-8794.
Rykaczewski, Konrad. "Microdroplet growth mechanism during water condensation on superhydrophobic surfaces." Langmuir 28.20 (2012): 7720-7729.
Miljkovic, Nenad, Ryan Enright, and Evelyn N. Wang. "Effect of droplet morphology on growth dynamics and heat transfer during condensation on superhydrophobic nanostructured surfaces." ACS nano 6.2 (2012): 1776-1785.
N. Miljkovic, R. EnrighMiljkovic, Nenad, et al. "Jumping-droplet-enhanced condensation on scalable superhydrophobic nanostructured surfaces." Nano letters 13.1 (2012): 179-187., Y. Nam, K. Lopez, N. Dou, J. Sack, E. N. Wang, Nano Lett. 2012, 13, 179.
K. A.Wier, Kevin A., and Thomas J. McCarthy. "Condensation on ultrahydrophobic surfaces and its effect on droplet mobility: ultrahydrophobic surfaces are not always water repellant." Langmuir 22.6 (2006): 2433-2436.Wier, T. J. McCarthy, Langmuir 2006, 22, 2433.
Dorrer, Christian, and Jürgen Rühe. "Condensation and wetting transitions on microstructured ultrahydrophobic surfaces." Langmuir 23.7 (2007): 3820-3824.
Mockenhaupt, Bernd, et al. "Superhydrophobicity of biological and technical surfaces under moisture condensation: Stability in relation to surface structure" Langmuir 24.23 (2008): 13591-13597.
Torresin, Daniele, et al. "Flow condensation on copper-based nanotextured superhydrophobic surfaces." Langmuir 29.2 (2013): 840-848.
Joanny, J. F., and Pierre-Gilles De Gennes. "A model for contact angle hysteresis." The journal of chemical physics 81.1 (1984): 552-562.
He, Bo, Junghoon Lee, and Neelesh A. Patankar. "Contact angle hysteresis on rough hydrophobic surfaces." Colloids and Surfaces A: Physicochemical and Engineering Aspects 248.1 (2004): 101-104.
Patankar, Neelesh A. "Hysteresis with regard to Cassie and Wenzel states on superhydrophobic surfaces." Langmuir 26.10 (2010): 7498-7503.
Chawla, N., and K. K. Chawla. "Microstructure-based modeling of the deformation behavior of particle reinforced metal matrix composites." Journal of Materials Science 41.3 (2006): 913-925.
Park, Hyungmin, Thomas P. Russell, and Soojin Park. "Spatial control of dewetting: Highly ordered Teflon nanospheres." Journal of colloid and interface science 348.2 (2010): 416-423.
Gao, Lichao, and Thomas J. McCarthy. "How Wenzel and Cassie were wrong." Langmuir 23.7 (2007): 3762-3765.
Extrand, C. W. "Contact angles and hysteresis on surfaces with chemically heterogeneous islands." Langmuir 19.9 (2003): 3793-3796.
Paxson, Adam T., and Kripa K. Varanasi. "Self-similarity of contact line depinning from textured surfaces." Nature commmunications 4 (2013): 1492.
Viovy, Jean Louis, Daniel Beysens, and Charles M. Knobler. "Scaling description for the growth of condensation patterns on surfaces." Physical Review A 37.12 (1988): 4965.
Narhe, R., Daniel Beysens, and V. S. Nikolayev. "Contact line dynamics in drop coalescence and spreading." Langmuir 20.4 (2004): 1213-1221.

Kim, Sunwoo, and Kwang J. Kim. "Dropwise condensation modeling suitable for superhydrophobic surfaces." Journal of heat transfer 133.8 (2011): 081502.
Song, Chaoming, Ping Wang, and Hernán A. Makse. "A phase diagram for jammed matter" Nature 453.7195 (2008): 629-632.
Wan, Y. Z., et al. "Preparation and Characterization of Different Particles—copper Electrocomposites." Journal of materials science letters 17.15 (1998): 1251-1253.
Balaji, et al. "Electrodeposition of bronze—PTFE composite coatings and study on their tribological characteristics." Surface and Coatings Technology 201.6 (2006): 3205-3211.
You, Yi-Hui, et al. "Electrochemical preparation and characterization of Ni—PTFE composite coatings from a non-aqueous solution without additives." Int. J. Electrochem. Sci. 7 (2012): 12440-12455.
Stankovic, V. D., and Miroslav Gojo. "Electrodeposited composite coatings of copper with inert, semiconductive and conductive particles." Surface and Coatings Technology 81.2-3 (1996): 225-232.
Whyman, Gene, Edward Bormashenko, and Tamir Stein. "The rigorous derivation of Young, Cassie—Baxter and Wenzel equations and the analysis of the contact angle hysteresis phenomenon." Chemical Physics Letters 450.4 (2008): 355-359.
Hanemann, T., & Szabó, D. V. (2010). Polymer-nanoparticle composites: from synthesis to modern applications. Materials, 3(6), 3468-3517.
Lixin, C., & Jiehui, Y. (1998). A new treated surface for achieving dropwise condensation. Journal of Enhanced Heat Transfer, 5(1).
Damle, V. G., Sun, X., & Rykaczewski, K. (2015). Can Metal Matrix-Hydrophobic Nanoparticle Composites Enhance Water Condensation by Promoting the Dropwise Mode?. Advanced Materials Interfaces, 2(16).
Sigma-Aldrich. Hydrophobic Polymers—Polymers. Retrieved from <https://www.sigmaaldrich.com/materials-science/material-science-products.printerview.html?TablePage=16372120> on Feb. 19, 2019, 1 page.
Gisele Azim et al., "Hydrophobicity of rare-earth oxide ceramics" Nature Materials 12 (2013), pp. 315-320.
Paxson, Adam T., et al. "Stable dropwise condensation for enhancing heat transfer via the initiated chemical vapor deposition (iCVD) of grafted polymer films." Advanced Materials 26.3 (2014): 418-423.
Rose, J. W. "Dropwise condensation theory and experiment: a review." Proceedings of the Institution of Mechanical Engineers, Part A: Journal of Power and Energy 216.2 (2002): 115-128.
Müller-Steinhagen, H., and Qi Zhao. "Investigation of low fouling surface alloys made by ion implantation technology." Chemical Engineering Science 52.19 (1997): 3321-3332.
Rausch, M. H., A. P. Froba, and A. Leipertz. "Dropwise condensation heat transfer on ion implanted aluminum surfaces." International Journal of heat and Mass transfer 51.5 (2008): 1061-1070.
Rausch, M. H., A. Leipertz, and A. P. Fröba. "Dropwise condensation of steam on ion implanted titanium surfaces." International Journal of Heat and Mass Transfer 53.1 (2010): 423-430.
Kananeh, A. Bani, et al. "Experimental study of dropwise condensation on plasma-ion implanted stainless steel tubes." International Journal of Heat and Mass Transfer 49.25 (2006): 5018-5026.
Woodruff, David W., and J. W. Westwater. "Steam condensation on electroplated gold: Effect of plating thickness." International Journal of Heat and Mass Transfer 22.4 (1979): 629-632.
O'neill, Gary A., and J. W. Westwater. "Dropwise condensation of steam on electroplated silver surfaces." International Journal of Heat and Mass Transfer 27.9 (1984): 1539-1549.
Marto, P. J., et al. "Evaluation of organic coatings for the promotion of dropwise condensation of steam." International Journal of heat and mass transfer 29.8 (1986): 1109-1117.
Anand, Sushant, et al. "How droplets nucleate and grow on liquids and liquid impregnated surfaces." Soft matter 11.1 (2015): 69-80.
Anand, Sushant, et al. "Enhanced condensation on lubricant-impregnated nanotextured surfaces." ACS nano 6.11 (2012): 10122-10129.
Rykaczewski, Konrad, et al. "Dropwise condensation of low surface tension fluids on omniphobic surfaces." Scientific reports 4 (2014).

(56) References Cited

OTHER PUBLICATIONS

Xiao, Rong, et al. "Immersion condensation on oil-infused heterogeneous surfaces for enhanced heat transfer." (2013).
Nosonovsky, Michael, et al. "Metal matrix composites for sustainable lotus-effect surfaces." Langmuir 27.23 (2011): 14419-14424.
Drelich, Jaroslaw, et al. "Wetting characteristics of liquid drops at heterogeneous surfaces." Colloids and Surfaces A: Physicochemical and Engineering Aspects 93 (1994): 1-13.
Drelich, Jaroslaw, et al. "Contact angles for liquid drops at a model heterogeneous surface consisting of alternating and parallel hydrophobic/hydrophilic strips." Langmuir 12.7 (1996): 1913-1922.
Lopez, Gabriel P., et al. "Imaging of features on surfaces by condensation figures." Science 260.5108 (1993): 647-649.
Kumar, Amit, and George M. Whitesides. "Patterned condensation figures as optical diffraction gratings." Science-AAAS-Weekly Paper Edition-including Guide to Scientific Information 263.5143 (1994): 60-61.
Morita, Masamichi, et al. "Macroscopic-wetting anisotropy on the line-patterned surface of fluoroalkylsilane monolayers." Langmuir 21.3 (2005): 911-918.
Raj, Rishi, et al. "Unified model for contact angle hysteresis on heterogeneous and superhydrophobic surfaces." Langmuir 28.45 (2012): 15777-15788.
Parker, Andrew R., and Chris R. Lawrence. "Water capture by a desert beetle." Nature 414.6859 (2001): 33-34.
Zhai, Lei, et al. "Patterned superhydrophobic surfaces: toward a synthetic mimic of the Namib Desert beetle." Nano Letters 6.6 (2006): 1213-1217.
Varanasi, Kripa K., et al. "Spatial control in the heterogeneous nucleation of water." Applied Physics Letters 95.9 (2009): 094101.
Mishchenko, Lidiya, et al. "Design of ice-free nanostructured surfaces based on repulsion of impacting water droplets." ACS nano 4.12 (2010): 7699-7707.
Mishchenko, Lidiya, et al. "Spatial control of condensation and freezing on superhydrophobic surfaces with hydrophilic patches." Advanced functional materials 23.36 (2013): 4577-4584.
He, Min, et al. "Hierarchically structured porous aluminum surfaces for high-efficient removal of condensed water." Soft Matter 8.25 (2012): 6680-6683.
Anderson, David M., et al. "Using Amphiphilic Nanostructures to Enable Long-Range Ensemble Coalescence and Surface Rejuvenation in Dropwise Condensation." ACS nano 6.4 (2012): 3262-3268.
Yao, C. W., et al. "Droplet contact angle behavior on a hybrid surface with hydrophobic and hydrophilic properties." Applied Physics Letters 101.11 (2012): 111605.
Vonna, Laurent, and Hamidou Haidara. "Morphology and stability of water condensation structures on a series of self-similar micropatterned substrates." Soft Matter 9.3 (2013): 765-771.
X. Chen, R. Ma, H. Zhou, X. Zhou, L. Che, S. Yao, Z. Wang, Sci. Rep. 2013, 3.
Chen, Xuemei, et al. "Nanograssed micropyramidal architectures for continuous dropwise condensation." Advanced functional materials 21.24 (2011): 4617-4623.

Ghosh, Aritra, et al. "Enhancing dropwise condensation through bioinspired wettability patterning." Langmuir 30.43 (2014): 13103-13115.
Hou, Youmin, et al. "Recurrent filmwise and dropwise condensation on a beetle mimetic surface." ACS nano 9.1 (2014): 71-81.
Zhao, Hong, and Daniel Beysens. "From droplet growth to film growth on a heterogeneous surface: condensation associated with a wettability gradient." Langmuir 11.2 (1995): 627-634.
Medici, Marie-Gabrielle, et al. "Edge effects on water droplet condensation." Physical Review E 90.6 (2014): 062403.
Beysens, Daniel. "Dew nucleation and growth." Comptes Rendus Physique 7.9-10 (2006): 1082-1100.
Beysens, D. "The formation of dew." Atmospheric research 39.1-3 (1995): 215-237.
Beysens, D., and C. M. Knobler. "Growth of breath figures." Physical review letters 57.12 (1986): 1433.
Beysens, D., C. M. Knobler, and H. Schaffar. "Scaling in the growth of aggregates on a surface." Physical Review B 41.14 (1990): 9814.
Enright, Ryan, et al. "Condensation on superhydrophobic surfaces: The role of local energy barriers and structure length scale." Langmuir 28.40 (2012): 14424-14432.
Cassie, A. B. D., and S. Baxter. "Wettability of porous surfaces." Transactions of the Faraday society 40 (1944): 546-551.
Minnich, Austin, and Gang Chen. "Modified effective medium formulation for the thermal conductivity of nanocomposites." Applied Physics Letters 91.7 (2007): 073105.
Nan, Ce-Wen, et al. "Effective thermal conductivity of particulate composites with interfacial thermal resistance." Journal of Applied Physics 81.10 (1997): 6692-6699.
Bernardin, John D., et al. "Contact angle temperature dependence for water droplets on practical aluminum surfaces." International journal of heat and mass transfer 40.5 (1997): 1017-1033.
Narhe, R. D., & Beysens, D. A. (2004). Nucleation and growth on a superhydrophobic grooved surface. Physical review letters, 93(7), 076103.
Chen, C. H., Cai, Q., Tsai, C., Chen, C. L., Xiong, G., Yu, Y., & Ren, Z. (2007). Dropwise condensation on superhydrophobic surfaces with two-tier roughness. Applied Physics Letters, 90(17), 173108.
Jung, Y. C., & Bhushan, B. (2008). Wetting behaviour during evaporation and condensation of water microdroplets on superhydrophobic patterned surfaces. Journal of microscopy, 229(1), 127-140.
Boreyko, J. B., & Chen, C. H. (2009). Self-propelled dropwise condensate on superhydrophobic surfaces. Physical Review Letters, 103(18), 184501.
Zheng, Y., Han, D., Zhai, J., & Jiang, L. (2008). In situ investigation on dynamic suspending of microdroplet on lotus leaf and gradient of wettable micro- and nanostructure from water condensation. Applied Physics Letters, 92(8), 084106.
Patankar, N. A. (2010). Supernucleating surfaces for nucleate boiling and dropwise condensation heat transfer. Soft Matter, 6(8), 1613-1620.

* cited by examiner

METAL MATRIX HYDROPHOBIC NANOPARTICLE COMPOSITES AND METHODS OF SYNTHESIS

RELATED APPLICATIONS

This application claims priority to U.S. provisional application Ser. No. 62/211,543, filed on Aug. 28, 2015, the entire contents of which are incorporated herein by reference.

BACKGROUND

Steam condensers are fundamental components of about 85% of electricity generation plants, and about 50% of the desalination plants installed globally. As a consequence, finding routes that even moderately improve efficiency of the condensation process could lead to considerable economic savings as well as environmental and societal benefits.

Since the 1930s, the hydrophobization of metal surfaces has been known to increase heat transfer during water condensation by up to an order of magnitude. This surface modification switches the condensation mode from filmwise (FWC) to dropwise (DWC). However, the use of hydrophobic coatings required to promote DWC introduces an additional resistance to heat flow. Thus, in simplified terms, to increase the total heat transfer rate, thermal resistance introduced by the hydrophobic coating must be significantly smaller than that posed by the water film during condensation.

While there are many techniques to render surfaces hydrophobic to promote DWC, most conventional coatings suffer from longevity issues. Moreover, in addition to their limited durability, most hydrophobic surface modifiers have a low thermal conductivity, preventing the widespread industrial adoption of the condensation mode. For example, to withstand the steam environment within a power plant condenser during the projected lifetime of the power station (about 40 years), it is estimated that a Polytetrafluoroethylene (PTFE) film must be about 20 to 30 μm thick, where the thermal resistance added by this thickness of the polymeric film negates any heat transfer enhancement attained by promoting DWC, (see for example J. W. Rose, Proc. Inst. Mech. Eng., A 2002, 216, 115.)

Recently, several alternative durable hydrophobic materials have been proposed including rare earth oxides, grafted polymers, and lubricant impregnated surfaces (LIS). Nevertheless, applying these materials as thin films makes them susceptible to variety of degradation issues including polymer oxidation at defect sites, ceramic film delamination due to thermal expansion coefficient mismatch between the film and underlying metal, and, for LIS, slow lubricant drainage with departing water drops.

Metal matrix composites with hydrophobic particles have been proposed as a durable alternative to thin film hydrophobic surface coatings. In particular, polished copper-graphite microparticle composites have been shown to have a macroscopic water drop contact angle of about 87° (see for example M. Nosonovsky, V. Hejazi, A. E. Nyong, P. K. Rohatgi, Langmuir 2011, 27, 14419.) The surface of this composite has heterogeneous wetting properties consisting of microscale hydrophobic patches on a hydrophilic background. Condensation and wetting on surfaces with microscale chemical and topological heterogeneities has been studied extensively, and surfaces comparable to those of the composites with microscale hydrophobic features have been demonstrated to flood during condensation. This mismatch between macroscale wetting properties and condensation mode stems from the multiscale nature of the phase change process. In practical terms, flooding of surfaces with microscale hydrophobic features occurs because microdroplets smaller than the features nucleate, grow, and coalesce into a film on the hydrophilic background surface surrounding the hydrophobic phase.

The flooding of composite surfaces during condensation can be prevented by engineering the materials on length scale greater than that of drop nuclei but significantly smaller than the average separation distance between microdroplet centers prior to onset of the coalescence dominated growth stage of about 5 to 10 μm.

SUMMARY

Some embodiments of the invention include a method of forming a metal matrix composite comprising introducing a plurality of nanoparticles into a flow of metal material, and mixing of at least a partial portion of the flow of metal material with at least some of the plurality of nanoparticles to form a mixture of the metal material and at least some of the nanoparticles. The method further includes forming a metal matrix composite from the mixture, where the metal matrix composite includes a bulk region and an outer surface including a plurality of hydrophobic regions dispersed within a hydrophilic surface region. Further, the plurality of hydrophobic regions is formed or derived from at least a portion of the plurality of nanoparticles, and the plurality of hydrophobic regions has a first diameter, and an average spacing between the hydrophobic regions is a second diameter, where the first and second diameters are about 100 nm to 400 nm.

In some embodiments, the flow is a molten metal flow, and the metal matrix composite is formed by cooling the molten metal flow below the melting point of the metal. In some further embodiments, the flow is a flow of a dispersion of the metal material, and the metal matrix composite is formed by coalescence of the metal material.

In some embodiments of the invention, the forming of the metal matrix composite includes a film or coating growth. In some embodiments, the flow of metal material comprises an electro-deposition flow, the metal material comprises metal ions, and the metal matrix composite is formed as a film or coating by growth or deposition of a metal of the metal material between and around the plurality of nanoparticles.

In some embodiments, the electro-deposition flow comprises a co-electro-deposition flow and the plurality of nanoparticles are electro-deposited. In some further embodiments, the flow of metal material comprises a vapor-deposition flow, the metal material comprises metal ions or metal atoms, and the metal matrix composite is formed as a film or coating by growth or deposition of a metal of the metal material between and around the plurality of nanoparticles.

In some embodiments, the metal material comprises copper. In other embodiments, the metal further includes aluminum alloyed with the copper. In some embodiments, the metal material includes a transition metal. In some embodiments, the metal is selected from nickel, iridium, zinc, titanium, gold, silver, beryllium, cobalt, iron, carbon steel, magnesium, molybdenum, platinum.

In some embodiments, the plurality of nanoparticles comprises ceramic or ceramic oxide nanoparticles. In some embodiments, the plurality of nanoparticles includes polymer nanoparticles. In some embodiments, the plurality of nanoparticles comprises ceria oxide nanoparticles.

In some embodiments of the invention, the metal matrix composite is formed as a film or coating. In other embodiments, the metal matrix composite is formed as a bulk material. In some embodiments, the bulk material is machining to an article of manufacture using at least one of subtractive manufacturing process including drilling, milling, turning, boring, sawing, and planing, extrusion, and cold-rolling.

In some embodiments, the metal matrix composite is formed using at least one of stir casting, pressure infiltration, squeeze casting, spray deposition, reactive processing, powder blending and consolidation, web-coating, and three-dimensional (in-situ casting), or any combination of these processes.

Some embodiments include the metal matrix composite formed into at least one of a block, rod, plank, tube, cube, or sphere. Some other embodiments further comprise machining the metal matrix composite to a an article of manufacture using at least one of subtractive manufacturing process including drilling, milling, turning, boring, sawing, and planing, extrusion, and cold-rolling.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1A:
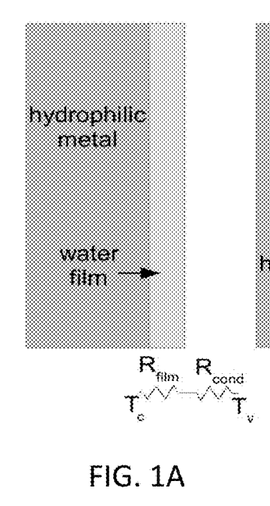
FIG. 1A is an illustration of water film formation on a hydrophilic (metal) surface.
Figures 1B, 1C:
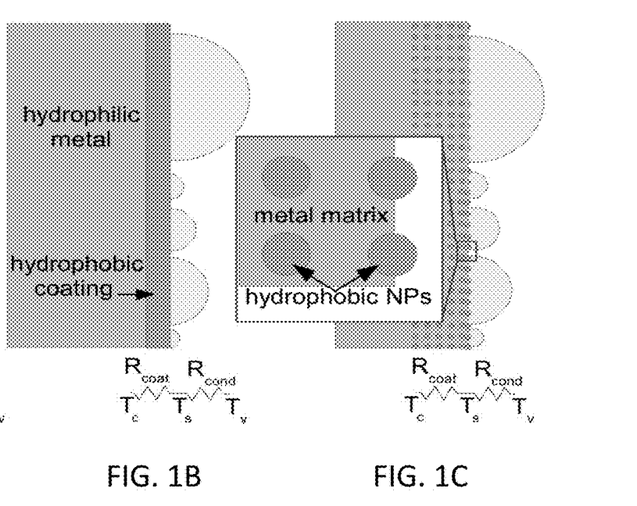
FIG. 1B provides an illustration of the use of traditional hydrophobic coating on a hydrophilic (metal) surface.
FIG. 1C is an illustration of metal matrix-hydrophobic nanoparticle with condensation.

FIG. 1A is an illustration of water film formation on a hydrophilic (metal) surface, and is indicative of promoting a surface modification that switches the condensation mode from filmwise (FWC) to dropwise (DWC). This condensation mode improves the heat transfer rate by preventing formation of a thermally insulating water film. FIG. 1B provides an illustration of the use of traditional hydrophobic coating on a hydrophilic (metal) surface. In this example, the use of hydrophobic coatings required to promote DWC introduces an additional resistance to heat flow.

Figure 1D:
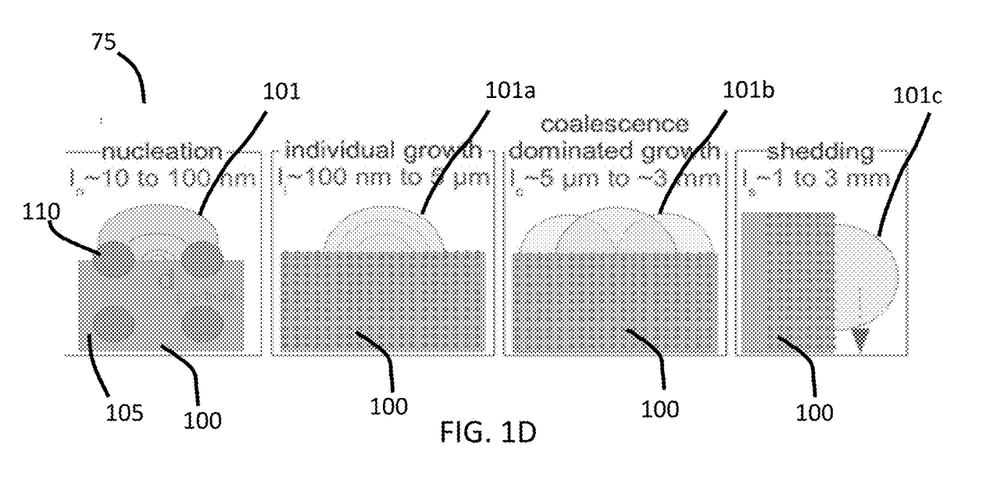
FIG. 1D is an illustration of length scales relevant to the four dropwise condensation stages including nucleation, individual droplet growth, drop coalescence dominated growth, and departure from surface via gravity assisted shedding in accordance with some embodiments of the invention.

Some embodiments of the invention can include materials suitable for hydrophobic surface coatings including metal matrix composites with hydrophobic particles. In some embodiments of the invention, the dispersion of hydrophobic nanoparticles with diameters, d, much lower than $l_{co}$ (i.e. d below about 500 nm) within the hydrophilic metal matrix can significantly disrupt individual droplet growth prior to as well as during onset of microdroplet coalescence. For example, FIG. 1C is an illustration of metal matrix-hydrophobic nanoparticle with condensation demonstrated for embodiments of the invention, where representative resistive heat transfer networks are also indicated with $T_c$, $T_s$, $T_v$, $R_{film}$, $R_{coat}$, $R_{cond}$, $R_{comp}$, and $R_{cond}$ corresponding to bulk condenser, surface, and vapor temperatures and water film, hydrophobic coating, composite, and condensation thermal resistances, respectively. Examples of the surface of this type of composite can include heterogeneous wetting properties consisting of microscale hydrophobic patches on a hydrophilic background (see for example M. Nosonovsky, V. Hejazi, A. E. Nyong, P. K. Rohatgi, Langmuir 2011, 27, 14419, the entire contents of which is incorporated by reference) Further, FIG. 1D is an illustration 75 of length scales relevant to the four dropwise condensation stages including nucleation, individual droplet growth, drop coalescence dominated growth, and departure from surface via gravity assisted shedding in accordance with some embodiments of the invention. In some embodiments, the composite 100 can comprise matrix 105, with a distribution of hydrophobic particles 110, and where droplet 101 behavior on the composite 100 is further shown as individual growth droplet 101a, coalescence dominated with droplet 101b, and with shedding droplet 101c. As shown, the droplet nucleation (ln) is about 1 to 100 nm, and coalescence (lc) is about 5 μm to 3 mm, and drop shedding (ls) is about 3 mm.

Figure 2A:
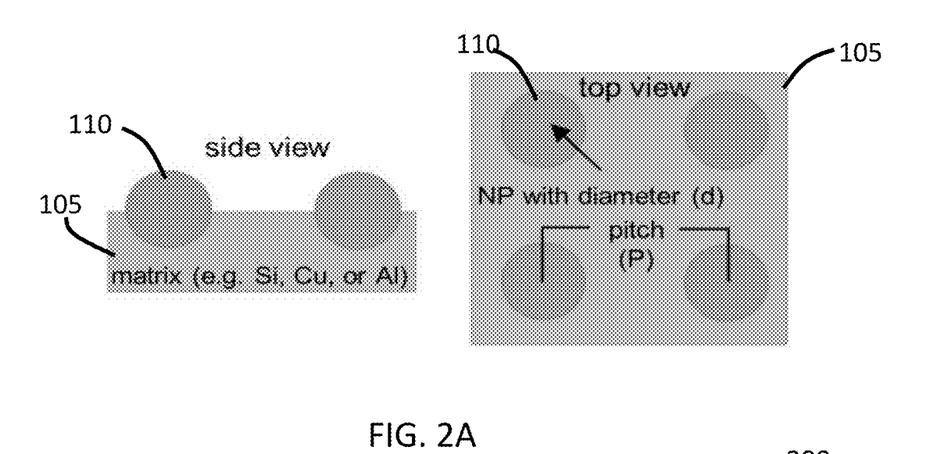
FIG. 2A shows an illustration of unit cell of spherical particles on a cubic lattice distributed on the surface in accordance with some embodiments of the invention.

The Cassie-Baxter equation can be used to predict the apparent contact angle of water droplets, sitting on structured and chemically heterogeneous surfaces with features much smaller than drop diameter (see for example A. B. D. Cassie, S. Baxter, Trans. Farad. Soc. 1944, 40, 546; b) P.-G. de Gennes, F. Brochard-Wyart, D. Quéré, Capillarity and Wetting Phenomena: Drops, Bubbles, Pearls, Waves, Springer, 2003, the entire contents of which is incorporated by reference). In particular, the $\cos \theta_c = \Sigma_{i=1}^{I_{max}} f_i \cos \theta_i$ where $f_i$ and $\theta_i$ are the liquid-solid interfacial area per unit plane base area and the water contact angle of individual phases present on the surface. In some embodiments, assumptions can include spherical hydrophobic particles (with static contact angle $\theta_{Hs}$) with diameter (d) distributed uniformly within the volume of the matrix (with static contact angle $\theta_{Ms}$) on corners of a cubic lattice (i.e. hemispheres on a square grid on the surface as shown in FIG. 2A with an illustration of unit cell of spherical particles 110 on a cubic lattice distributed on the surface of the matrix 105) with a center-to-center pitch (P). Further, the liquid-solid fractions of the matrix ($f_M$) and the hydrophobic phase ($f_n$) per unit base area can be expressed as a function of the P/d ratio: $f_M=1-0.25\pi(d/P)^2$ and $f_H=0.5\pi(d/P)^2$ (for flat PTFE circles the $f_M=1-0.25\pi(d/P)^2$ and $f_H=0.25\pi(d/P)^2$). In some embodiments, by substituting these expressions into the Cassie-Baxter equation, a P/d ratio that would render the composite material hydrophobic ($\theta_{os}>90°$) can be predicted. Subscript s, a, and r represent static, advancing, and receding contact angles respectively, and H and M represent hydrophobic and matrix phases respectively.

Figure 2B:
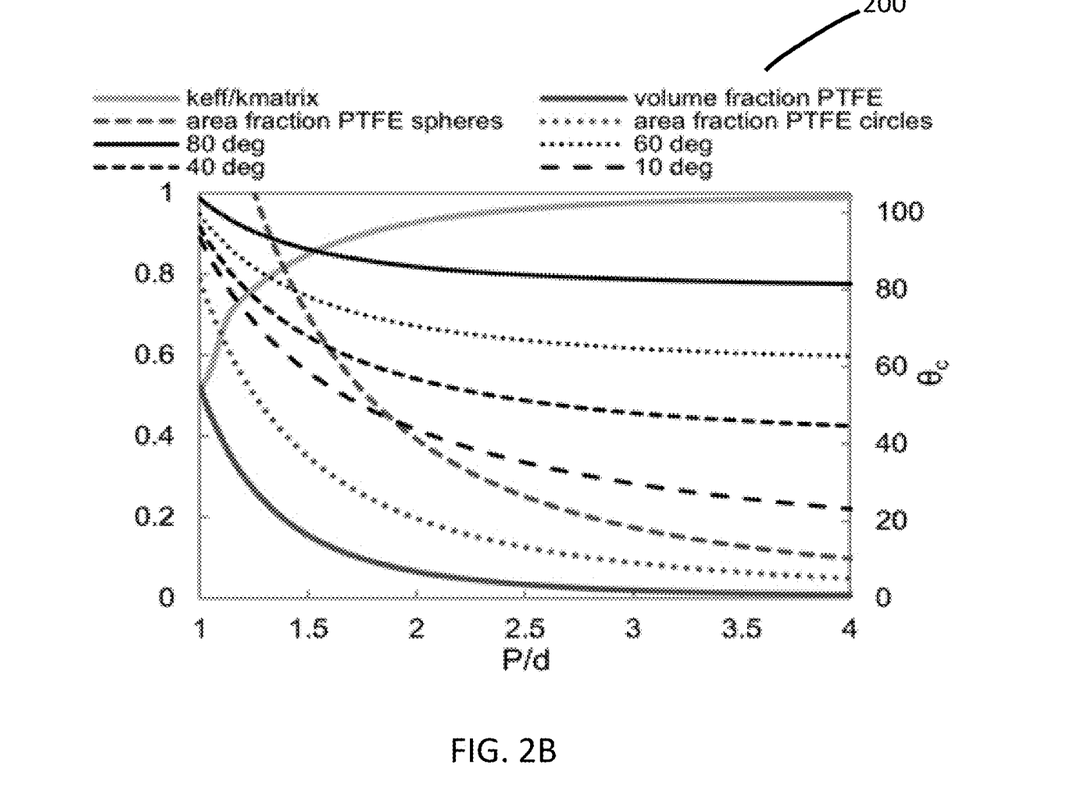
FIG. 2B shows plots of the effective composite contact angle as a function of the filler particle pitch to diameter ratio for different $\theta_{Ms}$ with $\theta_{Hs}$ of about 100°, the ratio of effective thermal conductivity to that of the matrix material, and the volumetric fraction of the hydrophobic phase as a function of the filler particle pitch to diameter ratio (P/d).

FIG. 2B shows graph 200 with plots of the effective composite contact angle as a function of the filler particle pitch to diameter ratio for different $\theta_{Ms}$ with $\theta_{Hs}$ about 100°, the ratio of effective thermal conductivity to that of the matrix material, and the volumetric fraction of the hydrophobic phase as a function of the filler particle pitch to diameter ratio (P/d). As illustrated, for a hydrophobic particles with static contact angle about 100° such as PTFE or ceria, a hydrophobic composite is achieved with a P/d (nanoparticle volume fraction) of 1.03 (0.5), 1.06 (0.45), 1.15 (0.34), and 1.35 (0.2), for matrix material with static contact angle ($\theta_{Ms}$) of 10°, 40°, 60°, and 80°, respectively. The corresponding effective thermal conductivity of the composite ($k_{eff}$) can be calculated based on the volume fraction ($\varphi_H$) of the hydrophobic reinforcement as well as the thermal conductivity of the two components ($k_M$ and $k_H$) using Maxwell's or Rayleight's formula.

For the case of a metal matrix (e.g. copper with $k_M$=400 W/mK) and a polymeric or ceramic reinforcement (e.g. PTFE or ceria with $k_H$ of 0.25 or 17 W/mK) with $k_M \gg k_H$, the two formulas can be expressed as function of φ only and converge on $k_{eff}/k_M=(2-2\varphi)/(2+\varphi)$. The graph in FIG. 2B shows that for P/d (volume fraction) of 1.03 (0.5), 1.06 (0.45), 1.15 (0.34), and 1.35 (0.2), $k_{eff}/k_M$ is 0.4, 0.44, 0.56, and 0.71, respectively. In other terms, for copper and aluminum matrices with $\theta_{Ms}$ of about 60° to 80° (with contact angle measurements using cleaned mirror polished metal surfaces), about 45% to 30% reduction in the total thermal conductivity can be expected from the addition of enough nanoparticles to make the composite hydrophobic. For copper, this reduction would correspond to $k_{eff}$~180 W/mK, which is higher than that of PTFE (about 0.25 W/mK) or ceria (about 17 W/mK), and comparable to pure aluminum (about 200 W/mK). Thus, metal matrix hydrophobic nanoparticle composites (hereinafter MMHNPCs) can provide the highly desired high thermal conductivity hydrophobic materials for improved condensation. However, the non-dimensional thermodynamic modeling of composite surface's static contact angle often does not correspond to condensation behavior, and prior studies have suggested that low contact angle hysteresis (hereafter "CAH") and not necessarily the hydrophobicity of surface ($\theta_{os}>90°$) is a better criterion for predicting whether a material is suitable to promote DWC. Consequently, the volume fraction of hydrophobic nanoparticles within metal matrix required to reduce the CAH sufficiently to promote DWC might be different from the values predicted using static contact angle calculations.

Some embodiments of the invention include compositions and methods of synthesis of metal matrix hydrophobic nanoparticle composites that comprise high thermal conductivity hydrophobic materials suitable for improved condensation and wetting performance. Some embodiments include a material surface or coating comprising an MMHNPC condenser including hydrophobic nanoparticles emerging out of a hydrophilic metal base. Further, some embodiments include methods for fabricating bulk materials or surfaces with ordered arrays of nanoscale hydrophobic heterogeneities on hydrophilic background with varied wetting properties. For example, some embodiments include metal matrix composites comprising Cu and Al with dispersed distributions of hydrophobic nanoparticles. In general, metals and/or metal alloys useful in forming the metal matrix hydrophobic nanoparticle composites include any metal with high thermal conductivity. For example, in some embodiments, metals and/or metal alloys useful in forming the metal matrix hydrophobic nanoparticle composites include nickel, iridium, zinc, titanium, gold, silver, beryllium, cobalt, iron, magnesium, molybdenum, platinum, and alloys of the above. Some further embodiments can include a metal matrix comprising brass, bronze, or carbon steel.

In some embodiments, the metal matrix composites can prepared as coatings, bulk materials, or a combination of two. Embodiments of the invention can utilize various conventional formation methods including, but not limited to co-electro-deposition, stir casting, pressure infiltration, squeeze casting, spray deposition, reactive processing, powder blending and consolidation, web-coating, three-dimensional (in-situ casting), or any combination of these processes. In some further embodiments, bulk composites can be fabricated (e.g., such as into a block, rod, plank, tube, cube sphere, etc.), that are then fabricated into functional parts. For example, in some embodiments, a block of the composite material can be fabricated through one of the above methods, and formed into functional parts through any standard machining and processing methods including, but not limited to, any conventional subtractive manufacturing process including drilling, milling, turning, boring, sawing, and planing, extrusion, and cold-rolling.

Embodiments of the invention can include hydrophobic nanoparticle comprising one or more hydrophobic polymers, copolymers (e.g., block copolymers), polymer blends, and mixtures thereof. Some embodiments of the invention can include polytetrafluoethylene and/or other conventional fluorinated polymers. Further, hydrophobic polymers useful for forming embodiments of the invention described herein include polymers listed at http://www.sigmaaldfich.com/materials-science/material-science products.html?TablePage=16372120, the entire contents of which is incorporated by reference.

In some further embodiments, the hydrophobic nanoparticle can comprise hydrophobic ceramics, lanthanide oxide series, including hydrophobic ceramics described in "Hydrophobicity of rare-earth oxide ceramics" by Gisele Azimi, Rajeev Dhiman, Hyuk-Min Kwon, Adam T. Paxson, and Kripa K. Varanasi, Nature Materials 12, 315-320 (2013) (found at http://www.nature.com/nmat/journal/v12/n4/abs/nmat3545.html), the entire contents of which is incorporated by reference. In other embodiments, the hydrophobic nanoparticle can comprise two-material particles (e.g. fumed silica).

In some embodiments, the surfaces of the metal matrix hydrophobic nanoparticle composites were mimicked by fabricating ordered arrays of PTFE nanospheres on silicon substrates using modification of the method described by Park et al. (see for example, H. Park, T. P. Russell, S. Park, J. Colloid Interface Sci. 2010, 348, 416, the entire contents of which are incorporated by reference). The method included oxygen plasma treatment and silanization processes. In some embodiments, in order to mimic different volumetric fractions of the hydrophobic nanoparticles, PTFE nanosphere arrays with varied pitch were fabricated by tuning the geometry of the polydimethylsiloxane (PDMS) soft stamps. In particular, in some embodiments, stamps were fabricated with parallel nano-grooves with line spacing (ls) of about 280 nm, about 420 nm, about 550 nm and about 830 nm by spin-coating uncured elastomer on optical gratings. In some embodiments, two types of specimens were made to mimic the composites having Cu-like and Al-like wetting properties with static contact angles of about 65° and about 77°, respectively.

Figure 3A:
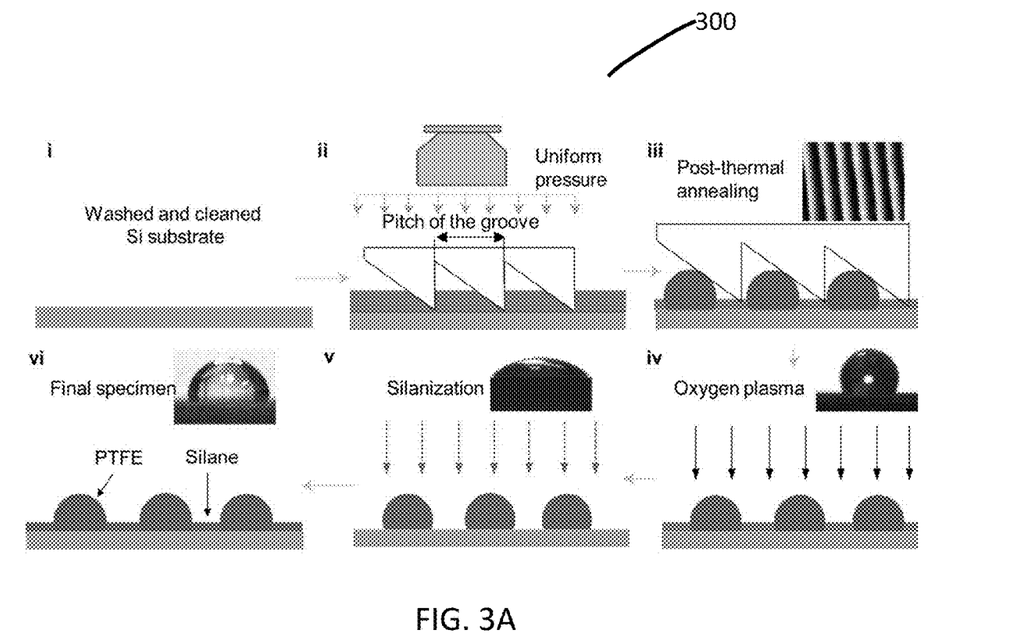
FIG. 3A is schematic of a mimicked composite fabrication procedure showing corresponding static water contact angles in accordance with some embodiments of the invention.

The fabrication of nanospheres included directed dewetting of liquid PTFE precursor using soft lithography and thermal annealing. For example, FIG. 3A is schematic 300 of a mimicked composite fabrication procedure with inset images showing corresponding static water contact angles (inset in iii shows example AFM image of a soft stamp surface) in accordance with some embodiments of the invention. In some embodiments, using a spin-coater (e.g., using an SCK model a Instras Scientific spin coater), polydimethylsiloxane (PDMS) soft patterns with parallel grooves of different pitches (about 280 nm, about 440 nm, about 550 nm and about 830 nm) were made by spin-coating a mixed and degassed mixture of PDMS elastomer base and curing agent (e.g., such as Sylguard® 184, Dow Corning®) (10:1 by mass) on glass gratings (from Thorlabs Inc.) having a corresponding groove pattern. In some embodiments, after spin coating, the PDMS was allowed to settle and de-aerate for about 20 minutes. In some embodiments, this procedure was followed by thermal curing on a hotplate at 85° C. for 115 minutes. The stamps were subsequently removed from the glass gratings and used in the further fabrication process. Dow Corning® and Sylgard® are registered trademarks of Dow Corning Corporation.

Using the method outlined in the steps of the schematic 300 of FIG. 3A, heterogeneous surfaces of composites were prepared by fabricating ordered arrays of PTFE nanospheres on silicon substrates using the PDMS stamps. For example, in some embodiments, a 1 cm×1 cm silicon wafer pieces were washed using water and ethanol, and cleaned using an oxygen plasma in a plasma reactor (e.g., using a Blue Lantern from Integrated Surface Technologies, Inc.) for one minute at pressure of about 250 mTorr and power of about 150 W. In some embodiments, a PTFE precursor solution (e.g., such as AF1600, from E. I. du Pont de Nemours and Company) was diluted in Fluorinert® FC-40 in the ratio of 1:4.25 by mass. In some embodiments, the solution was mixed in an ultrasonicator for about 10 seconds and heated at about 75° C. for a short period (for about 1-3 seconds). In some embodiments, the mixture was spin-coated on cleaned silicon substrate at 4500±60 RPM for about 1 minute. In some embodiments, immediately after spin-coating, the PDMS soft patterns (e.g., the PDMS stamps prepared as described above) were brought into contact with the PTFE solution covered silicon substrate and pressed using a 200 g weight (shown as step ii). In some embodiments, the assembly was thermally cured on a hotplate at a temperature of about 120° C. for about one hour. After completion of the curing process, the weight and PDMS patterns were removed from the substrate. In some embodiments, as fabricated, the samples with PTFE nanospheres had static contact angles above 100°, indicating the presence of a residual PTFE film. Fluorinert® is a registered trademark of 3M Company.

In some embodiments, residual PTFE thin film was removed using oxygen plasma etching (shown as step iv). In some embodiments, samples fabricated using the procedure described above were subjected to oxygen plasma at about 250 mTorr and about 150 W for three subsequent about 10 min intervals with about 1 min breaks. In some embodiments, following post plasma etching, the static water contact angles of the samples were found to be about 30° (thus confirming that the residual PTFE film in-between the spheres was removed.)

In some embodiments of the invention, the wetting property of the silicon background was modified using vapor phase silanization (shown as step v). For example, in some embodiments, the etched specimens along with a beaker containing silane solution (e.g., Chloro(dimethyl)octylsilane, Sigma Aldrich Corporation) were transferred to a desiccator and placed in an environmental chamber (e.g., model 5518, ETS Inc.) set at about 25° C. and about 15% relative humidity. The total silane exposure duration and the amount of silane used could be used to tune the resulting contact angle of the modified silicon wafer with PTFE nanospheres. In some embodiments, the desiccator was subsequently evacuated for about 15 min using a roughing vacuum pump (e.g., an Edwards Corporation model RX-5). In some embodiments, to produce Al-like samples, the etched specimens were exposed to about 100 μL of silane solution for about 4 h. In turn, the Cu-like samples were produced by exposure of the etched specimens to about 10 μL silane solution for about 30 minutes.

In some embodiments, the static contact angles of the bare silicon treated with the processes described above were found to be about 77°±1° and about 65°±4°, respectively. Control experiments were used to ensure that the silane was preferentially deposited on the exposed silicon, and not the PTFE nanospheres. In particular, a fully PTFE-coated wafer was exposed to the silane using the described procedure, and it was confirmed that the static contact angle of this sample was unaltered by the silane exposure. Additionally, an experiment was conducted to investigate if the directionality of the PTFE nanosphere rows had any impact on the CAH. In particular, the CAH was measured twice at the same sample location but at a 90° rotation relative to its previous orientation. It was found that the orientation did not affect the CAH value significantly (17°±1° vs. 15°±4°).

Figure 3B:
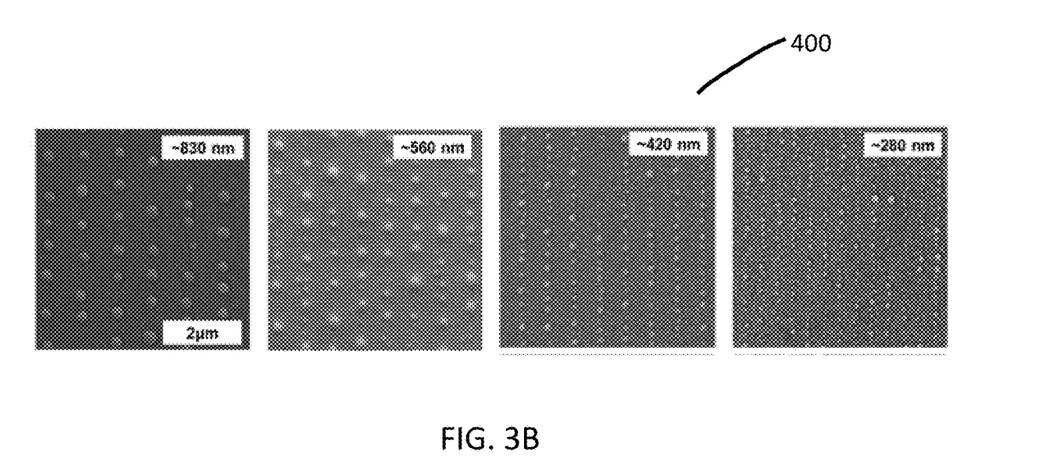
FIG. 3B shows SEM images of PTFE nanosphere arrays fabricated using hard mask gratings in accordance with some embodiments of the invention.

FIG. 3B shows SEM images 400 of PTFE nanosphere arrays fabricated using hard mask gratings with indicated line spacing (morphology of the grounding metal thin film required for high quality imaging is also visible in-between spheres) in accordance with some embodiments of the invention. The images of static water contact angle corresponding to different fabrication steps clearly illustrate the alteration of effective wetting properties of the composites induced by changes of the contact angle of the background surface (e.g., from $\theta_{Ms}$ of about 100° for PTFE to $\theta_{Ms}$ of less than 10° for clean Si to $\theta_{Ms}$ of about 60° to 80° for different silanes). In some embodiments, the silane deposition procedure can be modified to achieve background (i.e. measured on flat silane modified wafer without nanospheres) static water contact angles of 65°±4° and 77°±3° so as to fabricate samples that mimic surfaces of composites with "Cu-like" surfaces ($\theta_{Ms}$ about 60°) and "Al-like" surfaces ($\theta_{Ms}$ about 80°), respectively.

The images 400 shown in FIG. 3B represent typical PTFE nanosphere arrays resulting from thermal curing of spin-coated liquid PTFE precursor pressed by these four types of parallel groove PDMS stamps. The fabricated PTFE nanospheres have diameters in the range of about 120 to about 190 nm and are not arranged on a perfectly square grid. Table 1 below shows the geometrical parameters of PTFE nanosphere array fabricated with soft stamps made from gratings with indicated line spacing (ls), where 'a-b', d, $A_{fc}$ and $A_{fm}$ stand for the average values of rectangular grid sides, PTFE nanosphere diameter, and area calculated and measured area fractions respectively.

TABLE 1

| ls [nm] | 830 | | | 560 | | | 420 | | | 280 | | |
|---|---|---|---|---|---|---|---|---|---|---|---|---|
| parameter | a | b | d | a | b | d | a | b | d | a | b | d |
| | 328 ± 129 | 664 ± 42 | 135 ± 53 | 420 ± 108 | 603 ± 35 | 190 ± 31 | 209 ± 61 | 451 ± 41 | 120 ± 13 | 258 ± 72 | 319 ± 28 | 158 ± 27 |
| $A_{fc}$ | 0.065 ± 0.058 | | | 0.11 ± 0.047 | | | 0.12 ± 0.045 | | | 0.24 ± 0.11 | | |
| $A_{fm}$ | 0.088 | | | 0.12 | | | 0.13 | | | 0.17 | | |

As shown, all average grid dimension values presented in Table 1 are about 650 nm. Based on direct image analysis of SEM and AFM data, the samples fabricated with about 280 nm, about 420 nm, about 550 nm and about 830 nm line spacing gratings had PTFE area fractions of about 0.09, about 0.12, about 0.13, and about 0.17, respectively. As shown in Table 1, the area fractions calculated based on average diameters and grid dimensions (rectangle with side dimensions a and b) are in close agreement with the directly measured area fractions. Using AFM analysis, it was determined that in some embodiments, the oxygen plasma treatment flattened the nanospheres to a thickness of about 20 to 50 nm. Furthermore, the PTFE particle arrays uniformly covered entire about 1 cm² sample area and could be reproduced with high repeatability.

Figure 4A:
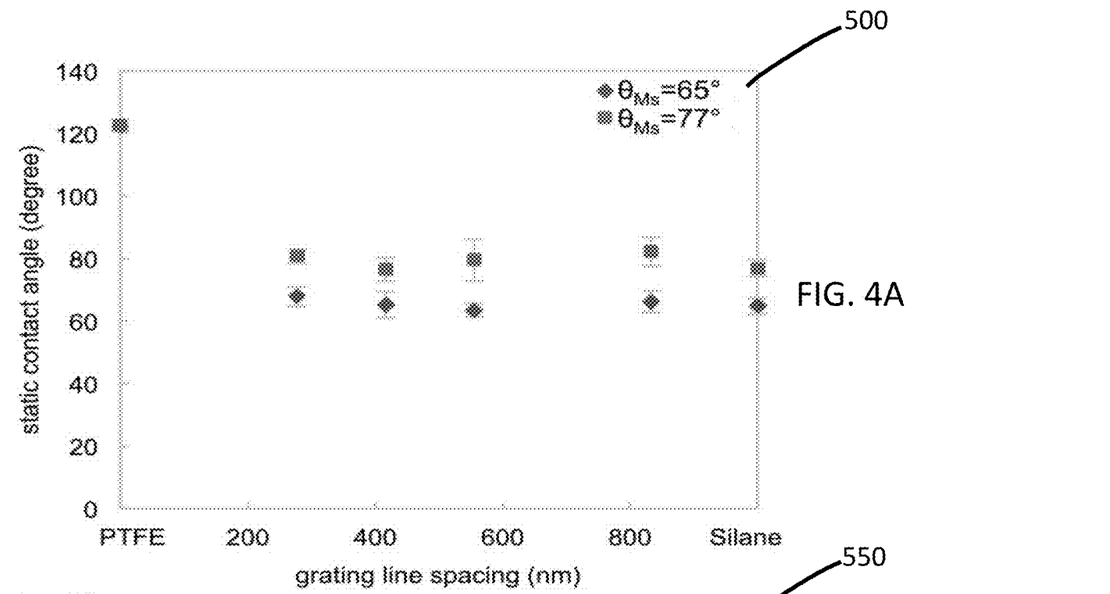
FIG. 4A shows static contact angles of mimicked composites with PTFE nanospheres arrays fabricated with gratings with different line spacing (ls) on silane modified silicon wafer with Cu-like ($\theta_{Ms}$ about 65°) and Al-like ($\theta_{Ms}$ about 77°) wetting properties in accordance with some embodiments of the invention.

In some embodiments, the presence of the nanosphere arrays having different area densities on the silane modified samples did not appreciably alter the static contact angle of water drops, but had a major effect on their contact angle hysteresis. Specifically, the plot 500 in FIG. 4A shows that for all mimicked Cu-like and Al-like composites the measured static contact angles were within about 5° of about 65° and about 80°, respectively. This observation is not surprising if we take into account the area fraction of the PTFE nanospheres is at most 0.2. Referring to FIG. 2B and Table 51, the Cassie-Baxter equation predicts a static contact angle increase below 5° for $\theta_{Ms}$ equal or greater than about 40°.

TABLE S1

Cassie-Baxter equation predictions of advancing and receding contact angles and contact angle hysteresis (CAH) using per contact line and per base area interfacial contact factors for surfaces with static contact angle of $\theta_{Ms}$ = 65° (CAH of 30°) and $\theta_{Ms}$ = 77° (CAH of 24°).

| | grating spacing (nm) | 890 | 550 | 440 | 280 |
|---|---|---|---|---|---|
| geometrical parameters | $P_{average}$ = (a + b)/2 (nm) | 496 | 512 | 330 | 288 |
| | $fl_H$ = d/$P_{average}$ | 0.27 | 0.37 | 0.36 | 0.55 |
| | $(d/P_{average})^2$ | 0.07 | 0.14 | 0.13 | 0.30 |
| | $f_H$ = | 0.06 | 0.11 | 0.10 | 0.23 |

TABLE S1-continued

Cassie-Baxter equation predictions of advancing and receding contact angles and contact angle hysteresis (CAH) using per contact line and per base area interfacial contact factors for surfaces with static contact angle of $\theta_{Ms} = 65°$ (CAH of 30°) and $\theta_{Ms} = 77°$ (CAH of 24°).

| | | grating spacing (nm) | 890 | 550 | 440 | 280 |
|---|---|---|---|---|---|---|
| | | $0.25(d/P_{average})^2$ | | | | |
| Per-line CB prediction $\theta_{Ms} = 77°$ | $\theta_2$ | | 103.0 | 105.2 | 105.0 | 109.2 |
| | $\theta_1$ | | 83.4 | 87.1 | 86.8 | 93.6 |
| | CAH | | 19.6 | 18.1 | 18.2 | 15.6 |
| Per-line CB prediction $\theta_{Ms} = 65°$ | $\theta_2$ | | 99.3 | 102.0 | 101.8 | 106.8 |
| | $\theta_1$ | | 75.8 | 80.7 | 80.3 | 89.0 |
| | CAH | | 23.4 | 21.3 | 21.5 | 17.8 |
| Per-area CB prediction $\theta_{Ms} = 77°$ | $\theta_2$ | | 98.3 | 99.4 | 99.3 | 102.2 |
| | $\theta_1$ | | 75.2 | 77.2 | 77.0 | 82.0 |
| | CAH | | 23.0 | 22.2 | 22.3 | 20.2 |
| Per-area CB prediction $\theta_{Ms} = 65°$ | $\theta_2$ | | 93.5 | 94.9 | 94.8 | 98.3 |
| | $\theta_1$ | | 65.1 | 67.7 | 67.4 | 74.0 |
| | CAH | | 28.5 | 27.2 | 27.3 | 24.3 |

Figure 4B:
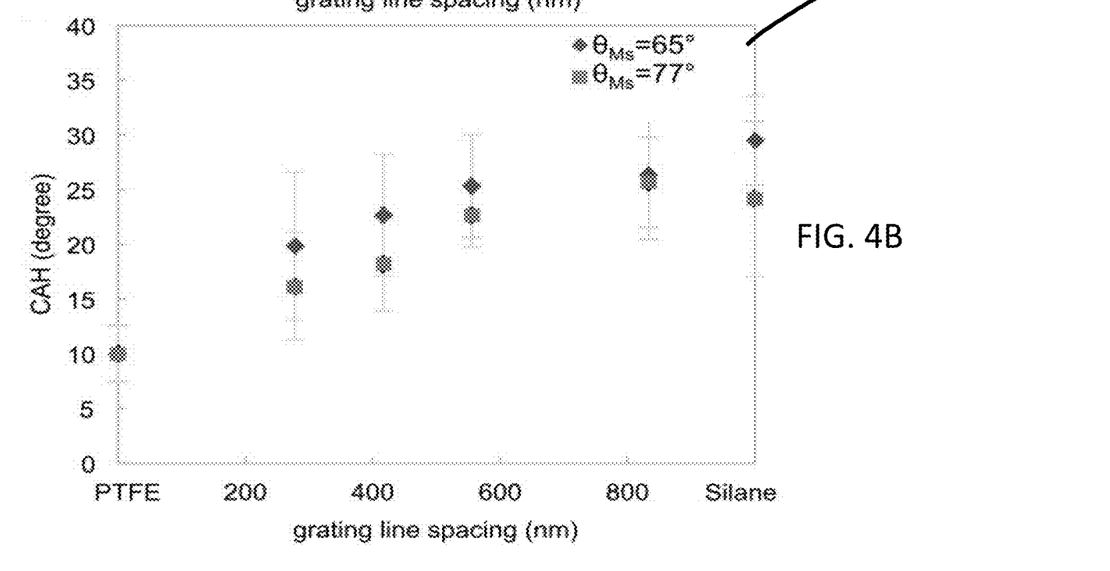
FIG. 4B shows contact angle hysteresis (CAH) of mimicked composites with PTFE nanospheres arrays fabricated with gratings with different line spacing (ls) on silane modified silicon wafer with Cu-like ($\theta_{Ms}$ about 65°) and Al-like ($\theta_{Ms}$ about 77°) wetting properties in accordance with some embodiments of the invention.

On the contrary to the static contact angles, the CAH was found to decrease significantly with increasing density of the hydrophobic phase. The plot 450 in FIG. 4B shows that the CAH was reduced by about 10° (about 33% to 42% reduction) with addition of the highest density of PTFE particles (fabricated with grating with line spacing of 280 nm corresponding to $A_f$ about 0.2) to the bare silane modified wafer. In particular, the CAH is reduced from about 25° to about 15° for $\theta_{Ms}$ of about 77°, and from about 30° to about 20° for $\theta_{Ms}$ about 65°. This decrease is more substantial than predicted by area fraction based Cassie-Baxter arguments (below 5°, see Table S1), however it can be explained by considering the effect of the hydrophobic phase on motion of the solid-liquid-air contact line around the perimeter of the drops. The contribution of the hydrophobic phase in Cassie-Baxter equation is evaluated per unit length of the drop perimeter not per unit base area. For the disc-like PTFE patches, the fraction of the total length of three phase contact line over hydrophobic phase as $fl_H$~d/P can be quantified. Further, the expression for $fl_H$ neglects any possible effects of bending of the contact line and effects of three dimensional drop surface distortions. Because the per base area arguments scale with $f_H$~$0.25\pi(d/P)^2$, the hydrophobic phase contribution is much more substantial when dynamic contact angles are evaluated using per contact line arguments. For example, by taking P~(a+b)/2, we get d/P vs. $025\pi$(d/P) of 0.27 vs. 0.06, 0.37 vs. 0.11, 0.36 vs. 0.10, and 0.55 vs. 0.23 for samples made with grating line spacing of 830 nm, 560 nm, 420 nm, and 280 nm, respectively. Substituting the $f_H$ and $fl_H$ and advancing and receding contact angle values for PTFE and silanes into Cassie-Baxter relation, a CAH change can be estimated, obtained from adding the densest distribution of PTFE discs (280 nm line spacing) to the silane modified substrate. Using the per base area and per contact line arguments a CAH decrease can be estimated of about 4° to about 5° and about 9° to about 12°, respectively (see Table 51 for all values). Consequently, a small addition of about 0.2 area fraction of nanoscale hydrophobic patches onto a hydrophilic matrix can substantially reduce the CAH of macroscale water drops by altering the contact line motion dynamics.

Figure 5:
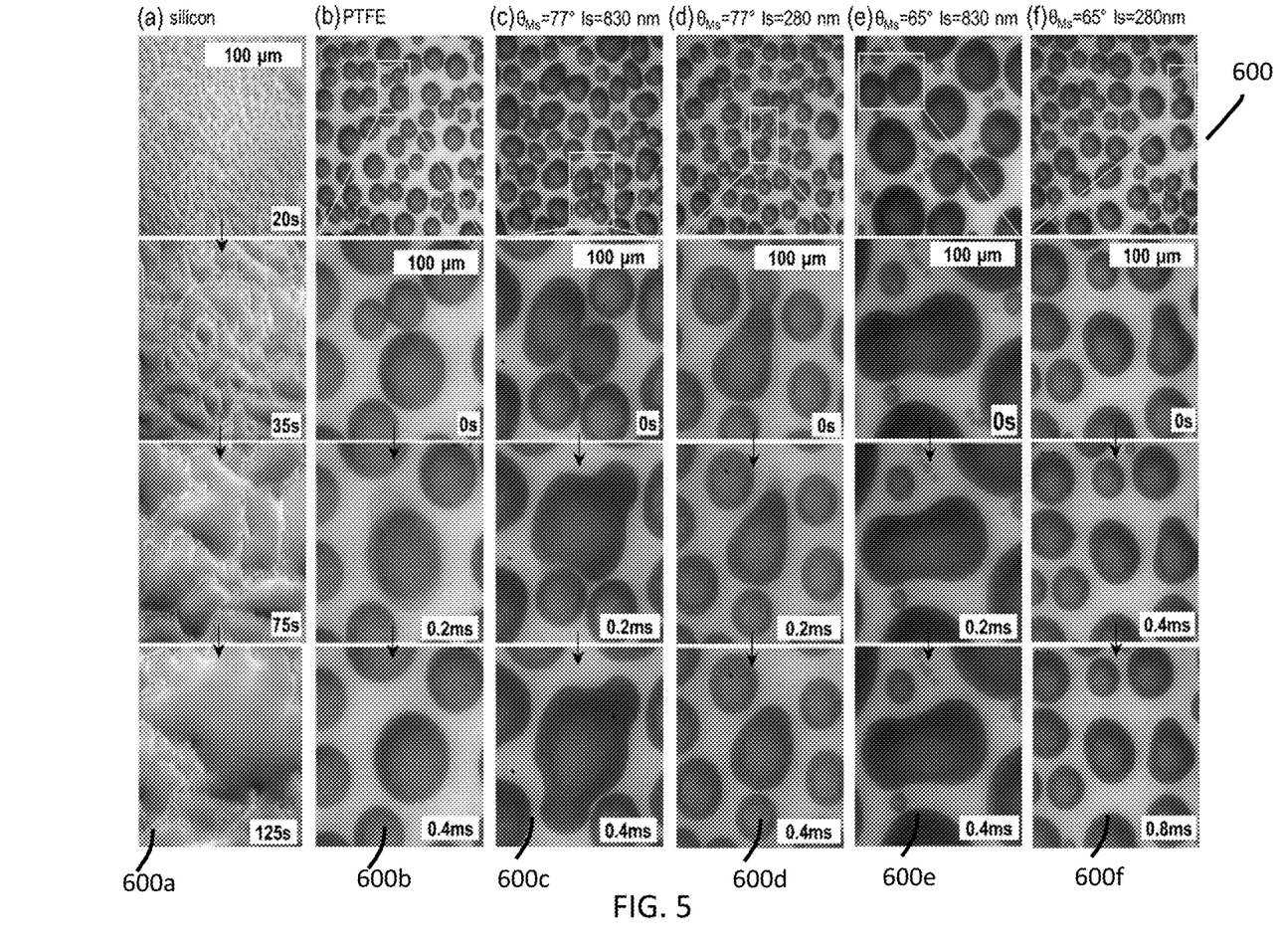
FIG. 5 shows a sequence of optical images illustrating microscale droplet dynamics during water condensation on plasma cleaned silicon (shown as set (a)), PTFE coated silicon (shown as set (b)), and mimicked composites with PTFE nanospheres arrays fabricated with gratings with 830 nm and 280 nm line spacing (ls) on silane modified silicon wafer with Cu-like (where $\theta_{Ms}$ is about 65°) and Al-like (where $\theta_{Ms}$ is about 77°) wetting properties (shown as (c) to (f)) properties in accordance with some embodiments of the invention.

FIG. 5 shows a sequence of optical images 600 illustrating microscale droplet dynamics on composite samples prepared by the methods as described herein during water condensation on plasma cleaned silicon (shown as set (a)), PTFE coated silicon (shown as set (b)), and mimicked composites with PTFE nanospheres arrays fabricated with gratings with 830 nm and 280 nm line spacing (ls) on silane modified silicon wafer with Cu-like (about 65°) and Al-like (about 77°) wetting properties (shown as (c) to (f)), in accordance with some embodiments of the invention. In some embodiments, the droplet dynamics illustrate the bounding cases of rapid DWC-to-FWC mode and sustained DWC mode. In particular, the sequence of images in 600*a* and 600*b* columns of FIG. 5 contrast coalescence dynamics on bare plasma cleaned and PTFE coated silicon wafers. Because the first sample has a receding contact angle below 5°, the outer part of the water droplets' contact line does not move after a coalescence event. This leads to rapid formation of highly distorted film (perimeter circularity, $p_c$<<1) that eventually merge into a continuous film. In contrast, microdrops formed by coalescence on the PTFE coated silicon recoil into equilibrium spherical cap shape with circular perimeter within about 0.1 ms ($p_c$ about 0.9). On a macroscale, this sample has a high receding contact angle (about 110°) and very low CAH (about 10°).

The other images (columns 600*c* through 600*f*) show that on both Cu-like and Al-like samples increasing contact line fraction ($fl_H$~d/P) of the PTFE nanospheres from 0.27 to 0.55 (fabricated with gratings with line spacing of 830 nm to 280 nm) significantly reduces contact line pinning. Specifically, images in 600*c* and 600*e* of FIG. 5 show that after merging, drops on the composites with $fl_H$~0.27 are highly deformed and essentially cover the outline of pre-coalescence drops (the compound drops in bottom images of 600*c* and 600*e* have $p_c$ about 0.6 to 0.7). In contrast, the sets of images 600*d* and 600*f* of FIG. 5 show that within 0.4 ms after the droplets merge on composites with $fl_H$~0.55, the contact line retracts to form drops with high circularity ($p_c$ about 0.8 to 0.9). Thus, by increasing the amount of nanoscale hydrophobic patches on the composite samples, there is a decrease in macroscopic CAH, and an amendment of microdroplet coalescence dynamics to nearly resemble those occurring during sustained DWC mode on the fully PTFE coated sample. In this mode, the microdroplets continue to grow primarily via coalescence until they are pulled-off the surface by gravity.

Figure 6A:
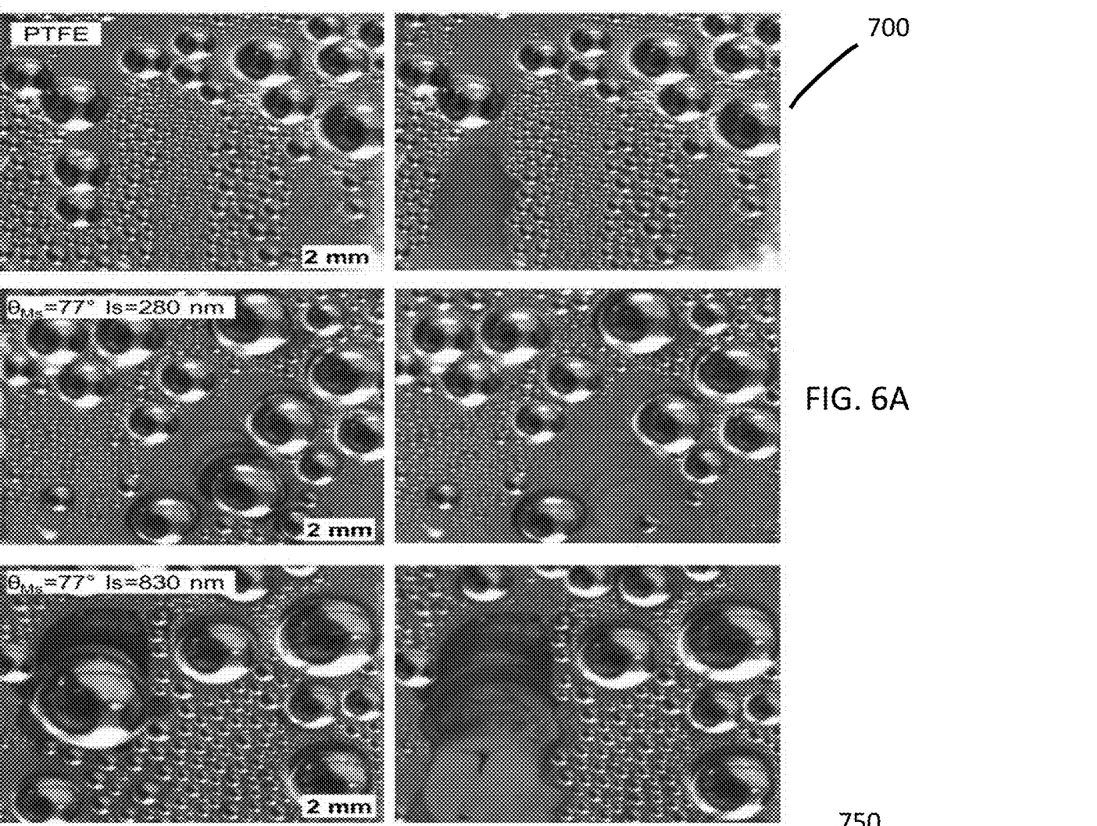
FIG. 6A illustrates drop departure radius for mimicked composites PTFE nanospheres arrays fabricated with gratings with varied line spacing on silane modified silicon wafer with Cu-like (where $\theta_{Ms}$ is about 65°) and Al-like (where $\theta_{Ms}$ is about 77°) wetting properties in accordance with some embodiments of the invention.
Figure 6B:
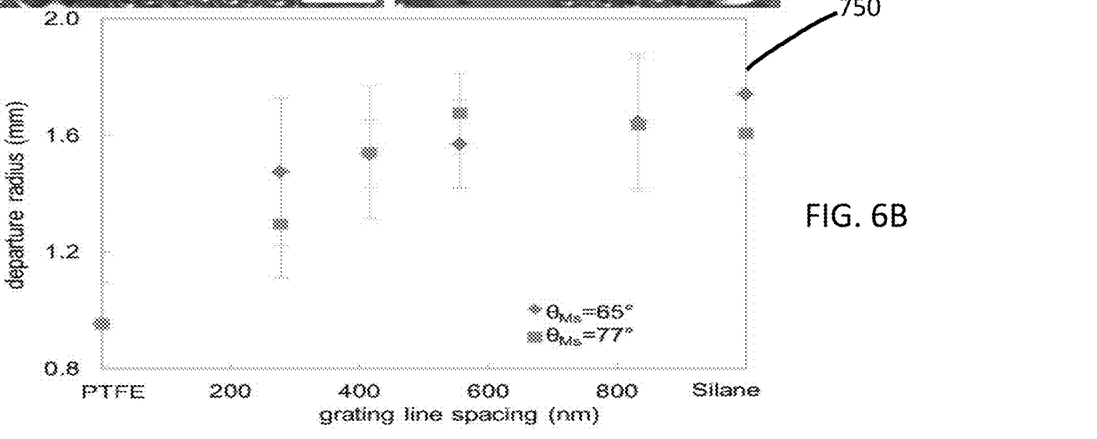
FIG. 6B illustrates departure radius for silane and PTFE modified wafers in accordance with some embodiments of the invention.

The heat transfer rate during sustained DWC increases with decreasing drop departure radius (see for example J. W. Rose, Proc. Inst. Mech. Eng. A 2002, 216, 115.) The impact of surface configuration of mimicked composites on the drop departure radius can be shown using steady state condensation experiments on vertically mounted specimens. Using an environmental chamber with air at temperature of 298 K±1 K and relative humidity of 92%±3%, microscale condensation behavior of composite samples was measured using a surface mounted K-type thermocouple, and adjusted manually by varying the Peltier element input current to achieve sub-cooling of about 20 to about 25 K. The images 700 of FIG. 6A illustrate drop departure radius for mimicked composites PTFE nanospheres arrays fabricated with gratings with varied line spacing on silane modified silicon wafer with Cu-like (about 65°) and Al-like (about 77°) wetting properties in accordance with some embodiments of the invention. The images 700 were captured during about an hour of continuous condensation, and analyzed to determine average drop departure radius. The graph 750 of FIG. 6B illustrates departure radius for silane and PTFE modified wafers in accordance with some embodiments of the invention, where there is an average of at least 6 departing drops. As for CAH, the drop departure radius decreases with increasing PTFE fraction on the surface, and the specimen fully coated by PTFE had the smallest drop departure radius of about 1 mm, while the silane coated samples had the largest drop departure radii of about 1.6 to 1.7 mm. The addition of the densest PTFE nanosphere array (made with grating with line spacing of 280 nm) reduced the drop departure radii to about 1.3 mm and about 1.45 mm for the Al-like and Cu-like composites, respectively. This change corresponds to about 40% of possible reduction towards the minimum reference departure radius set by drops shedding from the continuous PTFE coating. Further, the PTFE nanosphere array made from a grating with a line spacing of about 440 nm had less pronounced effect, while presence of coarse arrays (grating with line spacing of 550 nm and above) did not alter the departure radius. Furthermore, the increase of hydrophobic phase density can lead to lower departure radius on the composite with higher static contact angle such as $\theta_{Ms}$ of about 77°. This observation is in agreement with the absolute CAH of the Al-like composite being lower than that of the Cu-like composite. Further, despite the lack of any hydrophobic phase, the solely silane modified silicon wafers can promote sustained DWC where 'non-filmwise-mode' condensation can be attributed to the flat topography of the silicon wafer.

The condensation heat transfer coefficient for different composites can be shown by substituting experimentally observed contact angles and departure drop radii into a DWC model.

The model predicts heat transfer through a drop with radius r and contact angle θ:

$$q_d = \frac{\Delta T \pi r^2 \left(1 - \frac{r_c}{r}\right)}{\left(\frac{\delta}{\sin^2\theta k_{coat}} + \frac{r\theta}{4k_w \sin\theta} + \frac{1}{2h_i(1-\cos\theta)}\right)} \quad \text{(Eq. 1)}$$

where $\Delta T$, $r_c$, $h_i$, $\delta$, $k_{coat}$, $k_w$, and are the surface subcooling, critical nucleation radius, interfacial liquid-vapor heat transfer coefficient, thickness of the coating, and thermal conductivities of the coating and liquid water, respectively. The overall heat transfer rate per unit area for different surface subcooling was obtained by integrating the product of $q_d$ and drop size distribution, $\pi(r)$, from $r_c$ to the departure radius of curvature $r_c = r_{base}/\sin\theta$:

$$q'' = \Sigma q_d n(r) dr \quad \text{(Eq.2)}$$

The total condensation heat transfer coefficient, h, can be obtained through a linear fit of the calculated heat transfer rate per unit area for modeled surface sub-cooling range. The effect of the hydrophobic nanoparticle filler on the overall heat transfer can be incorporated using equivalent thermal conductivity of the composites calculated using the Maxwell model (δ and $k_{coat}$). The volumetric fraction of spherical PTFE nanoparticles corresponding to the PTFE nanosphere arrays on mimicked composites can be estimated by assuming a cuboid lattice with sides a and b (e.g., see Table 1) and height of (a+b)/2, and the upper bound of the highest estimated volume fraction (grating with line spacing of 280 nm) is only 0.15. Further, the volume fraction of hydrophobic nanoparticles required to promote DWC on MMHNPC can be substantially smaller than the theoretically estimated volume fraction of nanoparticles required to render the composite surface hydrophobic (see for example FIG. 2B).

Figure 7A:
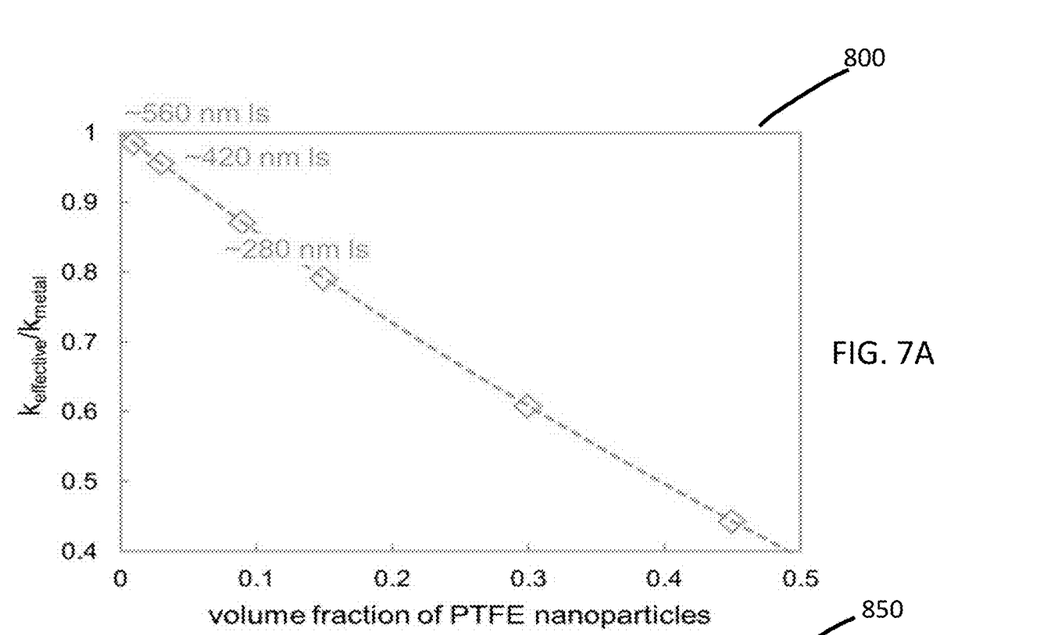
FIG. 7A shows effective thermal conductivity of a metal matrix material scaled by matrix metal conductivity as a function of different volume fractions of hydrophobic PTFE nanoparticles where volume fractions corresponding to different nanosphere line spacing (ls) of the mimicked composites are indicated in accordance with some embodiments of the invention.

The graph 800 of FIG. 7A shows effective thermal conductivity of a metal matrix material scaled by matrix metal conductivity as a function of different volume fractions of hydrophobic PTFE nanoparticles where volume fractions corresponding to different nanosphere line spacing (ls) of the mimicked composites are indicated in accordance with some embodiments of the invention. The data indicates that a 0.15 volumetric fraction of PTFE nanoparticles can cause a minor (about 0.2) reduction in $k_{eff}/k_M$. However, as described earlier, metal samples can comprise a roughness higher than that of the nearly perfectly smooth silicon wafers. Consequently, a larger volumetric fraction of hydrophobic particles may be needed to promote DWC using these composites. To account for this possibility, heat transfer can be modeled on composites with volumetric fraction of hydrophobic particles three times higher than the upper bound set by our experiments (i.e. 0.45).

Figure 7B:
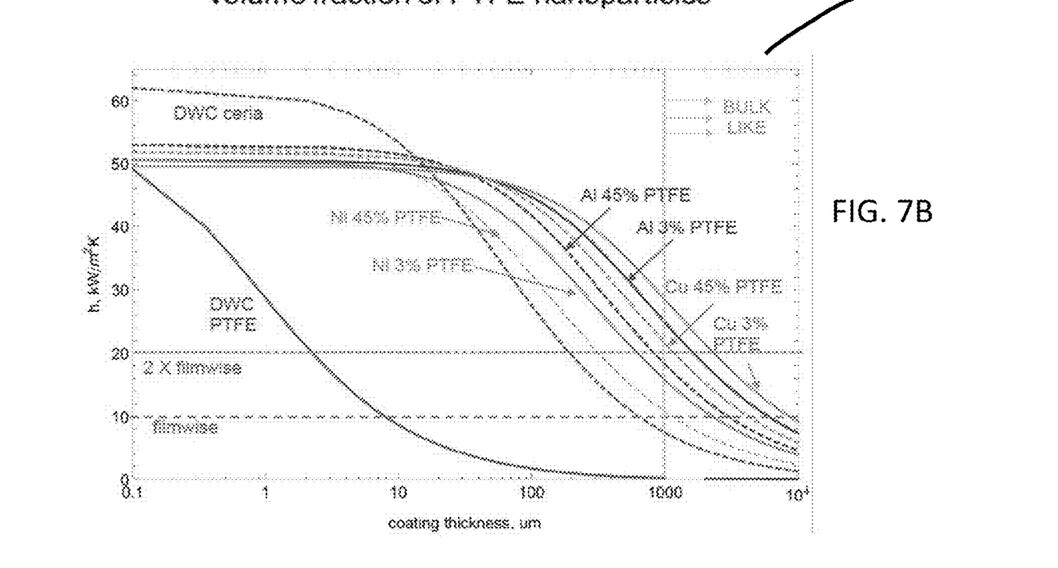
FIG. 7B shows modeled heat transfer coefficient for different thickness hydrophobic coatings consisting of PTFE film, ceria film, and different composition Al-PTFE nanoparticle or Cu-PTFE nanoparticle composites with volume fraction between 0.03 to 0.45 (3 to 45%). For reference, heat transfer coefficient for filmwise condensation occurring on bare copper is also shown, in accordance with some embodiments of the invention.

The calculated heat transfer coefficients for different thicknesses of aluminum as well as copper matrix composites with PTFE nanoparticle filler with volume fraction between 0.03 and 0.45 are shown in the graph 850 of FIG. 7B. The heat transfer coefficients for DWC occurring on a PTFE and ceria films (departure radius of about 1.35 mm) with different thicknesses are shown, and for reference, the heat transfer coefficient for filmwise condensation of water occurring in same conditions (calculated using the Nusselt model) is also shown. This theoretical analysis predicts that benefits of enhancing DWC using a low thermal conductivity polymer such as PTFE are annulled when the film is thicker than about 6 µm. In turn, a 6-fold and a 3-fold heat transfer enhancement over FWC can be achieved by using higher thermal conductivity ceria film even with a thickness of about 10 µm and about 100 µm, respectively. However, the mismatch of the thermomechanical properties of metals commonly used in condensers and ceria can lead to delamination of the ceramic film, and might be avoided with use of MMHPCs prepared as described herein. Further, the heat transfer analysis suggests that the 5-fold heat transfer enhancement over FWC achieved by using these materials can be sustained even with composite thicknesses of 100 to 200 µm. Furthermore, about a 2-fold heat transfer enhancement can be obtained with essentially bulk-like composite with thickness of 1 mm. Most importantly, the condensation heat transfer enhancement achieved by use of the composites with thicknesses below about 1 mm is nearly independent of the volume fraction of hydrophobic nanoparticles (within the modelled 0.03 to 0.45 range). This result highlights the benefit of using metal matrices with high thermal conductivity. Even when reduced by half of the matrix material's conductivity by presence of hydrophobic nanoparticles, Cu and Al based composites have thermal conductivities much greater than that of ceria and PTFE ($k_{Cu0.45PTFE}$ about 177 W/mK and $k_{Al0.45P11}$±, about 105 W/mK vs. $k_{ceria}$ about 17 W/mK for ceria). Consequently, even if it turns out that a higher content of hydrophobic nanoparticles than projected by our experiments is required to promote DWC on metal matrices with industrial surface finish (i.e. not perfectly flat), this is unlikely to significantly reduce achieved heat transfer enhancement.

In some embodiments, the heat transfer modeling results can also be used to roughly quantify a threshold thermal resistance posed by DWC promoter coating, $R''_t$ about L/k, that negates the advantages of DWC and reduces the net heat transfer rate to level attained by FWC without any coating (i.e. when in the modelled saturation conditions $h_{DWC}/h_{FWC}$ about 1). Specifically, for both PTFE and ceria $R''_t$ about $2.5 \times 10^{-5}$ K/W ($R''_t$ about $6 \times 10^{-6}/0.25$ about $4.8 \times 10^{-4}/17$ about $2.5 \times 10^{-5}$ K/W). For a promoter material with given thermal conductivity, this value of threshold thermal resistance can be used to quickly estimate threshold thickness of the coating ($L_t$ about $R''_t k$) when $h_{DWC}/h_{FWC}$ is about 1.

From the industrial point of view, it can be assumed that at least a two-fold heat transfer enhancement should be attained by promoting DWC ($h_{DWC}/h_{FWC}$ about 2) in order to justify cost of the DWC promoter coating. For both PTFE and ceria films, $h_{DWC}/h_{FWC}$ about 2 is attained when L about $L_c/3$ (i.e. R"~R"$_c/3$). Using these simple arguments, it can be estimated that copper and aluminum matrix composites fully loaded with PTFE nanoparticles (experimental limit of about 0.64[23]) can be used to promote DWC and at least double heat transfer rate over FWC if they are thinner than 800 μm and 500 μm, respectively.

In summary, using the materials and methods described herein, composites and surfaces can be processed to alter the droplet condensation mode from FWC to DWC using hydrophobic nanoparticles with diameters and spacing much smaller than the coalescence onset length scale of about 5 μm (e.g. diameters of about 100 to 400 nm). Further, to promote DWC of water, surfaces do not need a static contact angle greater than 90° (i.e. be hydrophobic), and need to have a low CAH. Low CAH can be attained with significantly lower hydrophobic nanoparticle density than that required to make the surface hydrophobic, where the hydrophobic phase on the surface facilitates movement of the drop contact line during coalescing and gravity assisted shedding.

Further, the materials and methods described herein can provide heat transfer enhancement (two fold and higher). For example, copper and aluminum matrix composites fully loaded with PTFE nanoparticles (maximum volume fraction about 0.64) can be used to promote DWC if their thickness is below about 0.5 mm. The maximum volumetric fraction is four times higher than the upper bound of volumetric fraction needed to facilitate droplet shedding. The use of a higher nanoparticle density can be used to reduce the CAH of rough surface composites (in contrast to flat silicon wafer used as base for our mimicked composites), and will not annul the heat transfer enhancement attained via DWC. In contrast to hydrophobic polymers, the described composites can promote DWC even when applied as bulk (thicker than 1 mm materials). This increases their durability as well as enables different processing and machining approaches such as extrusion, drilling, and polishing. Furthermore, any conventional method for forming bulk metal and metal matrix composite thick films and layers can be used.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of forming a metal matrix composite comprising:
   introducing a plurality of nanoparticles into a flow of metal material;
   mixing of at least a partial portion of the flow of metal material with at least some of the plurality of nanoparticles to form a mixture of the metal material and at least some of the nanoparticles;
   forming a metal matrix composite from the mixture, the metal matrix composite including a bulk region and an outer surface, the outer surface including a plurality of hydrophobic regions dispersed within a hydrophilic surface region,
   the plurality of hydrophobic regions being formed or derived from at least a portion of the plurality of nanoparticles; and
   wherein the plurality of hydrophobic regions have a first diameter, and an average spacing between the hydrophobic regions is a second diameter; and
   wherein the first and second diameters are about 100 nm to 400 nm.

2. The method of claim 1, wherein the flow is a molten metal flow, and wherein the metal matrix composite is formed by cooling the molten metal flow below the melting point of the metal.

3. The method of claim 1, wherein the flow is a flow of a dispersion of the metal material, and wherein the metal matrix composite is formed by coalescence of the metal material.

4. The method of claim 1, wherein the forming of the metal matrix composite includes a film or coating growth.

5. The method of claim 4, wherein the flow of metal material comprises an electro-deposition flow, the metal material comprises metal ions, and wherein the metal matrix composite is formed as a film or coating by growth or deposition of a metal of the metal material between and around the plurality of nanoparticles.

6. The method of claim 5, wherein the electro-deposition flow comprises a co-electro-deposition flow and the plurality of nanoparticles are electro-deposited.

7. The method of claim 1, wherein the flow of metal material comprises a vapor-deposition flow, the metal material comprises metal ions or metal atoms, and wherein the metal matrix composite is formed as a film or coating by growth or deposition of a metal of the metal material between and around the plurality of nanoparticles.

8. The method of claim 1, wherein the metal material comprises copper.

9. The method of claim 8, wherein the metal further includes aluminum alloyed with the copper.

10. The method of claim 1, wherein the metal material includes a transition metal.

11. The method of claim 1, wherein the metal is selected from nickel, iridium, zinc, titanium, gold, silver, beryllium, cobalt, iron, carbon steel, magnesium, molybdenum, platinum.

12. The method of claim 1, wherein the plurality of nanoparticles comprises ceramic or ceramic oxide nanoparticles.

13. The method of claim 1, wherein the plurality of nanoparticles includes polymer nanoparticles.

14. The method of claim 12, wherein the plurality of nanoparticles comprises ceria oxide nanoparticles.

15. The method of claim 1, wherein the metal matrix composite is formed as a film or coating.

16. The method of claim 1, wherein the metal matrix composite is formed as a bulk material.

17. The method of claim 16, wherein the bulk material is machining to an article of manufacture using at least one of subtractive manufacturing process including drilling, milling, turning, boring, sawing, and planing, extrusion, and cold-rolling.

18. The method of claim 1, wherein the metal matrix composite is formed using at least one of stir casting, pressure infiltration, squeeze casting, spray deposition, reactive processing, powder blending and consolidation, web-coating, and three-dimensional (in-situ casting), or any combination of these processes.

19. The method of claim 18, wherein the metal matrix composite is formed into at least one of a block, rod, plank, tube, cube, or sphere.

20. The method of claim 18, further comprising machining the metal matrix composite to an article of manufacture using at least one of subtractive manufacturing process including drilling, milling, turning, boring, sawing, and planing, extrusion, and cold-rolling.

* * * * *